(No Model.)
A. W. TISDALE.
LOG CARRIER.
No. 536,745. Patented Apr. 2, 1895.
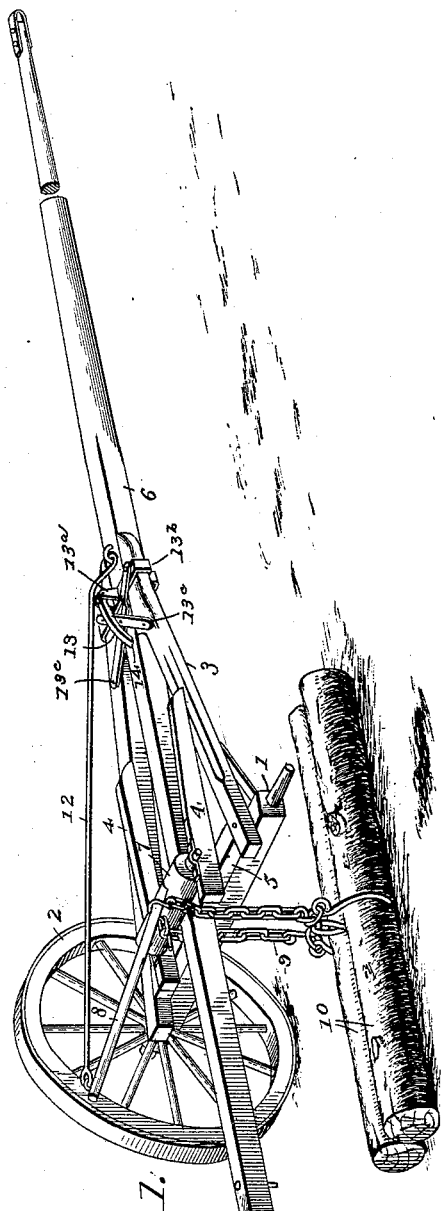
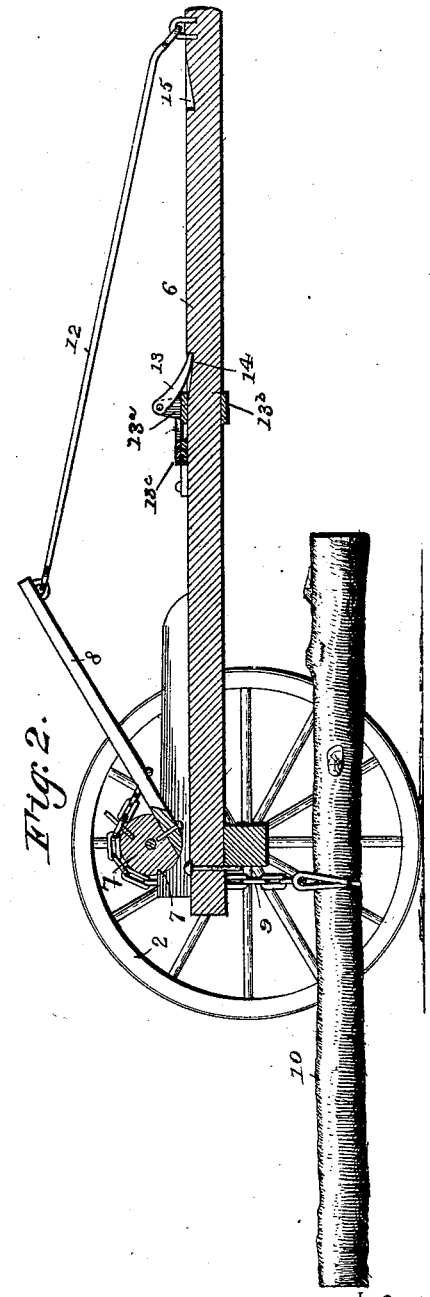
Witnesses
Julius Ulke Jr.
N. T. Riley
Inventor
Amos W. Tisdale,
By his Attorneys.
C. A. Snow & Co.

UNITED STATES PATENT OFFICE.

AMOS W. TISDALE, OF MOSELLE, MISSISSIPPI.

LOG-CARRIER.

SPECIFICATION forming part of Letters Patent No. 536,745, dated April 2, 1895.

Application filed September 25, 1893. Serial No. 486,473. (No model.)

*To all whom it may concern:*

Be it known that I, AMOS W. TISDALE, a citizen of the United States, residing at Moselle, in the county of Jones and State of Mississippi, have invented a new and useful Log-Carrier, of which the following is a specification.

The invention relates to improvements in log carriers.

The object of the present invention is to improve the construction of log carriers, and to provide a simple and inexpensive one, by which a log may be readily lifted clear of the ground by the draft animals, and which, when the log is lifted, will take the strain exerted by the log from the draft animals.

The invention consists in the construction and novel combination and arrangement of parts hereinafter fully described, illustrated in the accompanying drawings, and pointed out in the claims hereto appended.

In the drawings—Figure 1 is a perspective view of a log carrier embodying the invention, showing the position of the parts preparatory to lifting logs. Fig. 2 is a longitudinal sectional view of the same, showing the arrangement of the parts after the logs have been lifted.

Like numerals of reference indicate corresponding parts in both figures of the drawings.

1 designates an axle, having carrying wheels 2, journaled on its spindles and supporting the rear end of a truck frame, composed of hounds 3, longitudinally disposed bars 4, and transverse pieces 5, which are arranged on the axle between the hounds, and which have their inner adjacent ends spaced apart to receive a tongue, reach, or pole 6. The tongue or pole is continuous and elongated, and is slidingly mounted on the truck between the front ends of the hounds, and in the space between the transverse pieces 5.

The longitudinal bars 4 of the truck-frame are secured to the hounds and to the transverse pieces 5, and have journaled on them a transverse drum 7, to which is secured a lever or bar 8, and to which are connected chains 9. The chains 9 are provided with suitable grapples for engaging logs 10. The lever or bar 8 has its upper or outer end connected by a rod 12 with the tongue, whereby when the latter moves forward in the frame, the drum will be partially rotated to wind up the chains and lift the logs. After the logs have been lifted clear of the ground, the strain is taken from the draft animals by means of a hinged catch 13, mounted on the hounds at the front ends thereof, and arranged to engage a shouldered rack recess or tooth 14 of the tongue, to prevent the latter from moving backward. The recess or tooth 14 is shouldered at its front end; and a similar rack recess or tooth 15, which is shouldered at its rear end is arranged in advance of the recess 14, and at a suitable distance therefrom, to be engaged by the catch, when the latter is swung backward, as illustrated in Fig. 1 of the accompanying drawings, to enable the log carrier to be drawn when the tongue is shortened.

The catch 13, which engages the rack recesses 14 and 15, is pivotally mounted between upward extending perforated ears 13ª of a metal rectangular loop or frame 13ᵇ, which is supported by opposite braces 13ᶜ, secured at their front ends to the rectangular frame or loop 13ᵇ, and crossing each other and centrally secured together and having their rear ends fastened to the hounds.

The catch is adapted to be swung either in advance of or in rear of its point of attachment or pivot, and it is capable of automatically engaging the rack recesses 14 and 15 for holding the tongue in either of its positions.

It will be seen that the log carrier is simple and inexpensive in construction, that it enables a log to be readily lifted clear of the ground by the draft animal, and that when a log is so lifted the strain is removed from the draft animals.

Changes in the form, proportion, and the minor details of construction may be resorted to without departing from the principle or sacrificing any of the advantages of this invention.

What I claim is—

1. In a log carrier, the combination of an axle, a frame mounted thereon, a continuous elongated longitudinally movable tongue mounted in the frame and provided with reversely shouldered recesses, a reversible hinged catch mounted on the frame and arranged to swing either forward or rearward to engage automatically said recesses of the tongue in advance or in rear of its point of attachment to lock the tongue against either forward or rearward movement, a drum journaled on the frame and provided with a bar or lever connected with the tongue, and a chain attached to the drum for lifting a log, substantially as described.

2. In a log carrier, the combination with a truck, of a sliding reach projecting in front and rear of the wheels and provided with rack teeth or recesses, an adjusting lever arranged to rock on the truck, log chains secured to the adjusting lever, a chain secured to the adjusting lever and connected with the sliding reach, and a pawl for engaging the rack recesses or teeth, substantially as described.

In testimony that I claim the foregoing as my own I have hereto affixed my signature in the presence of two witnesses.

AMOS W. TISDALE.

Witnesses:
CHARLES J. DEVALL,
WILLIAM T. RAINEY.